April 20, 1926.                     W. J. JENKINS                     1,581,681
                        SHOCK ABSORBER FOR MOTOR ROAD VEHICLES
                              Filed April 2, 1924          2 Sheets-Sheet 1
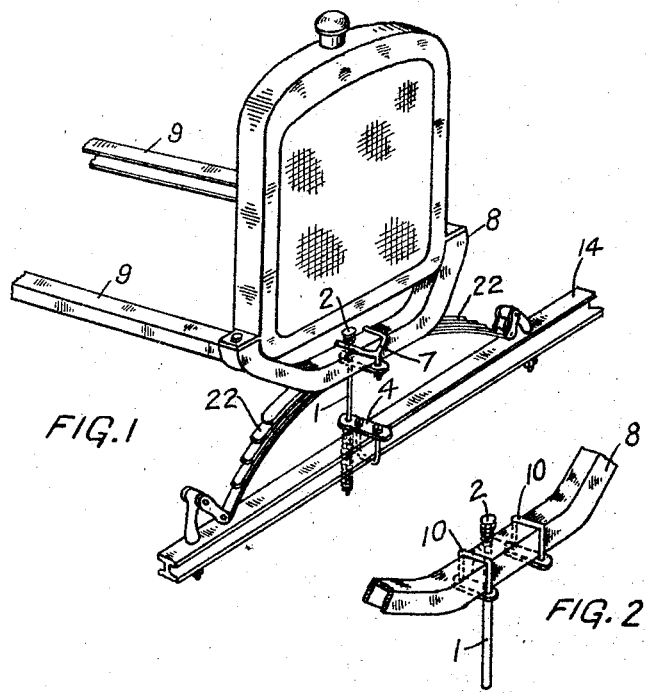
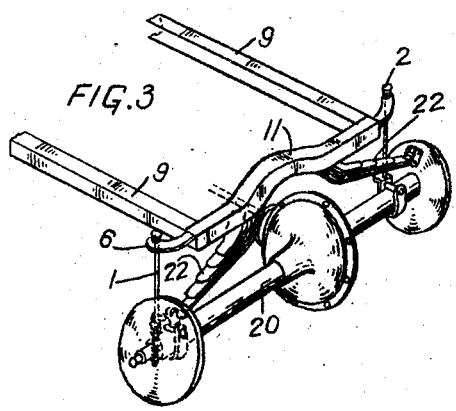
Inventor
W. J. Jenkins
By Marks & Clerk
        Attys.

April 20, 1926.
W. J. JENKINS
1,581,681
SHOCK ABSORBER FOR MOTOR ROAD VEHICLES
Filed April 2, 1924     2 Sheets-Sheet 2
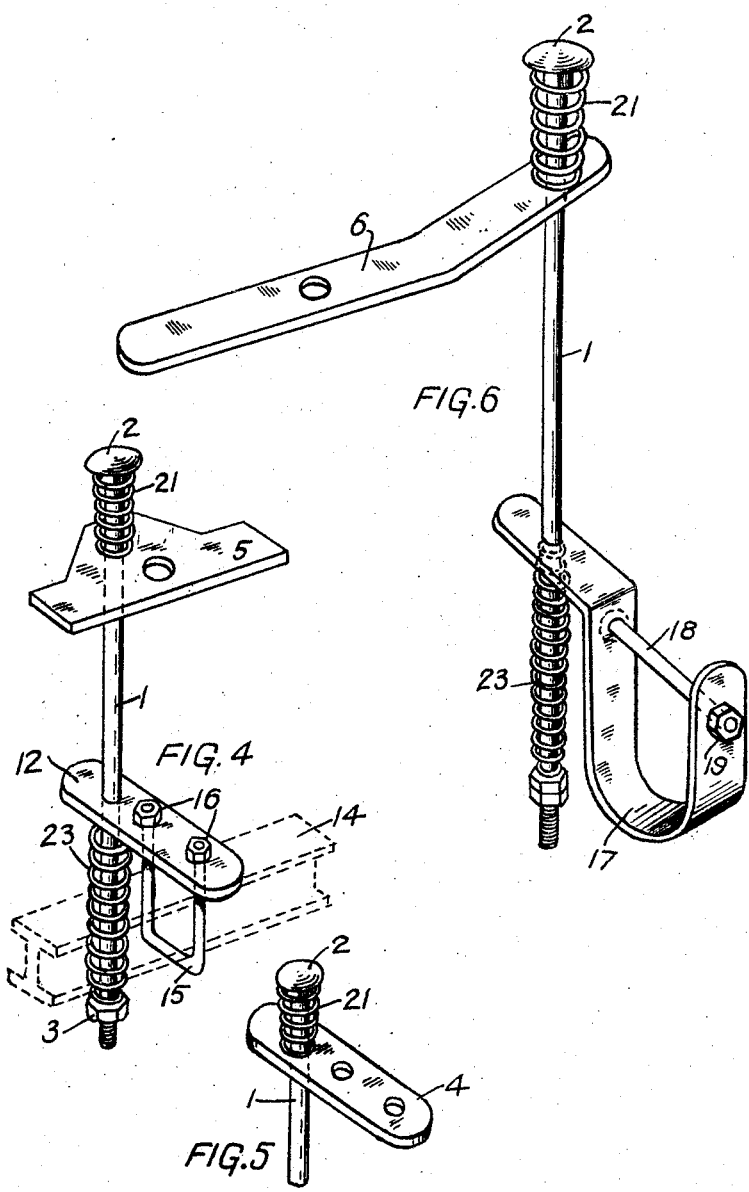
Inventor
W. J. Jenkins
By Marks & Clerk
Attys.

Patented Apr. 20, 1926.

1,581,681

UNITED STATES PATENT OFFICE.

WILLIAM JOSEPH JENKINS, OF ROSEVILLE, NEAR SYDNEY, NEW SOUTH WALES, AUSTRALIA.

SHOCK ABSORBER FOR MOTOR ROAD VEHICLES.

Application filed April 2, 1924. Serial No. 703,820.

*To all whom it may concern:*

Be it known that I, WILLIAM JOSEPH JENKINS, a subject of the King of Great Britain and Ireland, residing at Lane Cove Road, Roseville, near Sydney, New South Wales, Commonwealth of Australia, have invented certain new and useful Shock Absorbers for Motor Road Vehicles, of which the following is a specification.

This invention relates generally to shock absorbers and more particularly has reference to a snubber device for use on motor vehicles.

The invention as its primary aim and object resides in the provision of a snubber device to prevent breaking of the leaves of the transverse bearing springs through the chassis being restrained in its upward throw by the flexing of said bearing springs and incidentally to absorb shocks upon the return of the bearing springs.

The invention comprises a metal plate, clip, or bracket attachable to the chassis of the vehicle, a bolt with a head pendent from said plate or bracket, a coil spring around the said bolt the ends of which abut respectively the head of said bolt and the said plate, a nut or projection on the end of the bolt opposite to the head thereof, a coil spring around the bolt located between said nut or projection and a holed clip, plate, or bracket through which the bolt projects adapted to be secured either to the front or to the rear axles of certain types of motor road vehicles.

Referring to the accompanying drawings, Fig. 1 is a detail view illustrating the front part of a motor road vehicle whose front axle has fitted thereto transverse bearing springs, a shock absorber in accordance with the invention being fitted thereto; Fig. 2 a detail view illustrating a modified clip plate for the shock absorber; Fig. 3 a detail view of the rear portion of a motor road vehicle whose rear axle is fitted with transverse bearing springs and a shock absorber according to the invention being provided between the rear axle and the chassis; Fig. 4 a perspective view of the absorber complete with clips as shown in Fig. 2; Fig. 5 a broken detail view illustrative of one of the clip plates shown in Fig. 1; and Fig. 6 a perspective view of the absorber as shown in Fig. 3.

A bolt 1 is provided which is furnished with a head 2 at one end and with a nut or other projection 3 at its opposite end. Such bolt is adapted to have connected thereto either the plate 4, the plate 5, or the plate 6. If the plate 4 is used then the double armed clip 7 (Fig. 1) would be utilized for securing the plate 4 to the front bar 8 of the chassis 9, the said plate being holed to receive the bolt 1 and the clip 7. The plate 5 may, however, be similarly secured to the bar 8 of the chassis 9, by separate clips 10 (Fig. 2). When the absorber is to be fitted to the rear of the vehicle, the plate 6 would be used and bolted or otherwise suitably secured to the rear bar 11 of the chassis 9 (Fig. 3).

Another metal plate 12 is also attached to the bolt 1, such plate being adapted to be secured to the front axle 14 of the vehicle by means of a clip such as 15 which is capable of receiving securing nuts 16. For attachment to the rear axle the plate 12 is substituted by the plate 17 which is formed to receive the bolt 1 and to be secured by the bolt 18, carrying the securing nut 19, to the rear axle 20 of the vehicle.

Located between the head 2 of the bolt 1 and either of the plates 4, 5, or 6 and surrounding the bolt 1 is a coil spring 21, and encircling the bolt 1 and located thereon either between the plate 12 or the plate 17 and the nut 3 or other projection on the bolt 1 is the coil spring 23. The bearing springs 22 of the vehicle are arranged transversely of the chassis 9.

It is preferred when fitting the absorber means to vehicles to mount such means behind either the front or rear axles 14 or 20 of the vehicle as shown in Figs. 1 and 3.

In operation, upon the wheels of the vehicle meeting an obstruction or large road inequalities, whereby the bearing springs 22 are compressed, the plates 12 and 17 are capable of movement on the bolt 1 but the upward throw of the chassis 9 in relation to either of the axles 14 or 20 is restrained by the bolt 1 and the associated parts of the absorber, whilst the rebound movements of the springs 22 are received by the coil springs 21 and 23 and absorbed thereby and bouncing of the vehicle is greatly lessened. Further, the action of the absorber means tends to increase the durability of the transverse bearings springs 22 as the separate leaves of such springs are not subjected to rough usage owing to excessive play of the chassis 9 in relation to the axles 14 and 20.

What I claim as my invention and desire to secure by Letters Patent is:—

1. A snubber device for motor road vehicles provided with transverse bearing springs comprising a bolt with a projection on opposite ends thereof, a plate adapted to be secured to the chassis with which said bolt is connected, a coil spring associated with said bolt whose opposite ends abut respectively said plate and the projection at one end of said bolt, a plate adapted to be secured to the axle of the vehicle and slidably connected to said bolt, and a coil spring associated with said bolt and abutting at its opposite ends respectively with said latter plate and the projection at the other end of said bolt and being of greater tensile strength than the first spring, substantially as and for the purposes set forth.

2. A device of the character described comprising in combination with an axle, and a semi-elliptical bearing spring arranged over the axle and operably connected at its ends to the axle, of plate-like brackets fastened in opposed relation to the axle and spring and each including a projecting apertured portion the apertures of which align with each other, a bolt slidably mounted through the apertures of the projecting portions, a head on one end of the bolt, an adjustable element on the opposite end of the bolt, and coiled springs surrounding the upper and lower ends of the bolts and bearing respectively against the head and the adjacent bracket and against the adjusting element and the adjacent bracket, substantially as and for the purposes set forth.

In testimony whereof I affix my signature.

WILLIAM JOSEPH JENKINS.